US008266312B2

(12) United States Patent
Mammen

(10) Patent No.: US 8,266,312 B2
(45) Date of Patent: Sep. 11, 2012

(54) METHOD OF STREAMING SIZE-CONSTRAINED VALID XML

(75) Inventor: Ashok Cherian Mammen, Vellore (IN)

(73) Assignee: International Business Machines Corporation, Armonk, NY (US)

(*) Notice: Subject to any disclaimer, the term of this patent is extended or adjusted under 35 U.S.C. 154(b) by 1107 days.

(21) Appl. No.: 11/780,871

(22) Filed: Jul. 20, 2007

(65) Prior Publication Data

US 2009/0024753 A1    Jan. 22, 2009

(51) Int. Cl.
G06F 15/16    (2006.01)
(52) U.S. Cl. ........ 709/231; 715/231; 715/234; 715/236; 709/223
(58) Field of Classification Search .................. 709/231
See application file for complete search history.

(56) References Cited

U.S. PATENT DOCUMENTS

| 2004/0006741 | A1 | 1/2004 | Radja et al. | |
|---|---|---|---|---|
| 2004/0137877 | A1 | 7/2004 | Crowhurst et al. | |
| 2004/0148375 | A1 | 7/2004 | Levett et al. | |
| 2005/0177788 | A1* | 8/2005 | Snyder | 715/523 |
| 2007/0250766 | A1* | 10/2007 | Medi et al. | 715/513 |

OTHER PUBLICATIONS

Eran Chinthaka, "Get the most out of XML processing with AXIOM", Sep. 13, 2005, IBM, http://www.ibm.com/developerwors/library/x-axiom, all pages.*

Davis, S.J. and Burnett, I.S., "Exchanging XML Multimedia Containers Using a Binary XML Protocol," 2005 *IEEE International Conference on Multimedia and Expo*, (ICME 2005), Jul. 6, 2005, 358-361.
Wong, E.Y.C., Chan, A.T.S. and Leong, H.V., "*Extreme*: A Middleware for Streaming XML Contents Over Wireless Environments," *IEEE Transactions on Software Engineering*, vol. 30, No. 12, Dec. 2004.

* cited by examiner

*Primary Examiner* — Hua Fan
(74) *Attorney, Agent, or Firm* — Hamilton, Brook, Smith & Reynolds, P.C.

(57) ABSTRACT

Methods (100), systems (200), computer program products, and signal bearing mediums for streaming an eXtensible Markup Language (XML)-type document (210) over a communication network (240) are described. A sequence of commands are received and synchronously converted (112) into XML-type fragments (230) for assembling and streaming a single XML-type document for a mobile device (220) in the communication network (240). The size of the XML-type document (210) exceeds the size limit imposed by the available memory on the device but less than the size limit imposed by the transport layer of a communication network (240). A DTD of the XML-type document (210) can be broken up into logically independent elements. The XML-type fragments (230) are assembled (114) in a buffer that is constrained to be smaller in size than the size constraint of the transport layer of the communication network (240). Periodically, the assembled fragments (230) are flushed (116) from the buffer to the transport layer of the communication network (240) dependent upon the DTD of the XML-type document (210) without a limitation on the size of a message to communicate the XML-type document (210) over the transport layer without loss of information.

14 Claims, 3 Drawing Sheets

METHOD OF STREAMING SIZE-CONSTRAINED VALID XML

TECHNICAL FIELD OF THE INVENTION

The present invention relates to processing of markup language documents and more particularly to communication of eXtensible Markup Language (XML) documents.

BACKGROUND OF THE INVENTION

The Open Mobile Alliance (OMA) data synchronization and device management protocols define a process of exchanging commands between a mobile device and a server. Such commands are grouped together into messages. eXtensible Markup Language (XML) is used to represent the commands and messages. The size of a message, represented as a valid XML document, is limited either by the transport, such as short messaging service (SMS), object exchange (OBEX), or hypertext transfer protocol (HTTP), or by the memory available on either the device sending the message or the device receiving the message. One approach is to assemble the entire message in memory and then send the assembled message over the transport layer. This approach is acceptable in cases where the transport imposes a message-size limitation, although in practice this size limitation can be much larger than the available memory on the device. Therefore, this approach is inefficient if the message-size limitation is imposed by the memory of the transmitting device, because a larger number of messages must be exchanged over the transport, which prolongs the session. For example, in any TCP/IP based transport such as HTTP, connection establishment accounts for most of the time in a single message exchange.

U.S. Patent Application Publication No. 20040006741A1 published in the names of Radja et al on 8 Jan. 2004 and entitled "System and method for efficient processing of XML documents represented as an event stream" describes a system and method for processing a representation of an XML document to create a sequence of contiguous bytes for transfer from a source to a destination. The representation of the XML document is parsed into a set of information items. A relationship among the information items is determined from the representation of the XML document. An operation code is assigned to each information element based upon the determined relationship, where each assigned operation code defines how the associated information should be interpreted at the destination. The operation codes and information items are formed into a sequence of contiguous bytes suitable for transfer from the source to the destination, where the byte sequence does not depend upon any memory address assigned to the byte sequence.

Wong, E Y C, Chan A T S, and Hong V A, "Xstream: a middleware for streaming XML contents over wireless environments", IEEE Transactions on Software Engineering, V 30, N 12, December 2004, pp. 918-35, describes transcoding and augmentation of a source XML document in a wireless environment. A middleware, XML Streaming (Xstream), is proposed for streaming XML contents over a wireless environment by leveraging rich semantics and structural characteristics of XML documents and by flexibly managing units containing fragments of data into autonomous units, known as Xstream Data Unit (XDU) fragments. By fragmenting and organizing an XML document into XDU fragments, fragments can be incrementally sent across a wireless link, and the receiver can look-ahead process the document without having to wait for the entire document to be downloaded. The fragmenting strategy is based on the wireless link's Maximum Transfer Units (MTUs). A collection of XDUs are grouped into a packet to optimize packet delivery and processing using packetizing strategies. At the receiver, a reassembly strategy reconstructs the XML document as XDU fragments are received. This article presents a mechanism for transmitting only a specific fragment of an XML document and defines a mechanism to provide context information for a recipient to identify the XML fragment.

U.S. Patent Application Publication No. 20040148375A1 published in the names of Levett et al on 29 Jul. 2004 and entitled "Presentation service which enables client device to run a network based application" describes a presentation server that permits a client device to run a network-based application by sending structured data from various data sources to software on the client device. The client device has three layers. The first layer is a communications layer to send and receive messages over the network. The second layer is a database layer to store and allow querying of the structured data. The third layer is a rendering layer that generates data for a user interface from the structured data in the database layer. The client software is self-contained for providing the entire communications, data storage and rendering resources needed to run the network-based application on the client device.

U.S. Patent Application Publication No. 20040138787A1 published in the names of Ransom et al on 15 Jul. 2004 describes a power management architecture for an electrical power distribution system. The power management architecture contains various intelligent electronic devices (IED) distributed throughout the power distribution system to manage the flow and consumption of power from the system. A set of data to be communicated over the network as an XML document is generated. The data is transformed into an XML format as the data is generated, and the XML formatted data is communicated over the network. The process of transforming and communicating are repeated until the entire set of data has been communicated. Each IED is capable of incrementally generated or consuming communicated XML documents containing power management data without having to buffer the complete XML document in memory before, during or after processing. Thus, while XML fragments are aggregated in a buffer, the buffer only flushes once the entire document is assembled. This is a standard mechanism followed by any buffer output stream.

Davis, S J, and Burnett, I S, "Exchanging XML multimedia containers using a binary XML protocol" 2005 IEEE International Conference on Multimedia and Expo, 6-8 Jul. 2005, Amsterdam, Netherlands, describes an alternative to XML and a protocol for independent fragment access). The article states that XML is verbose and transmitting the large files can be wasteful in bandwidth and in power-limited mobile applications. A Remote XML Exchange Protocol (RXEP) is introduced that combines XML compression with a fragment access protocol. RXEP exchanges essential information while minimizing superfluous XML content transmission, making XML containers attractive for multimedia content delivery. The article proposes an encoding format for an XML document and presents a protocol to access fragments.

Thus, a need exists for a method that more efficiently exchanges messages over a transport layer of a communications network.

SUMMARY OF THE INVENTION

In accordance with an aspect of the invention, there is provided a method of streaming an eXtensible Markup Language (XML)-type document over a communication network. A sequence of commands are received and synchronously converted into a plurality of XML-type fragments for assembling and streaming a single XML-type document for a mobile device in the communication network, the size of the XML-type document exceeding the size limit imposed by the available memory on the device but less than the size limit imposed by the transport layer of a communication network, a DTD of the XML-type document being able to be broken up into logically independent elements. The XML-type fragments are assembled in a buffer that is constrained to be smaller in size than the size constraint of the transport layer of the communication network. The assembled fragments are periodically flushed from the buffer to the transport layer of the communication network dependent upon the DTD of the XML-type document without a limitation on the size of a message to communicate the XML-type document over the transport layer without loss of information.

In accordance with a further aspect of the invention, there is provided a system for streaming an eXtensible Markup Language (XML)-type document over a communication network. The system comprises a memory for buffering data and instructions, a communications interface for coupling the system to the communications network and a processor coupled to the memory and the communications interface. The processor executes instructions for: receiving and synchronously converting a sequence of commands into XML-type fragments for assembling and streaming a single XML-type document in the communication network, the size of the XML-type document exceeding the size limit imposed by the available memory on the device but less than the size limit imposed by the transport layer of a communication network, a DTD of the XML-type document being able to be broken up into logically independent elements; assembling the XML-type fragments in the memory that is constrained to be smaller in size than the size constraint of the transport layer of the communication network; and periodically flushing the assembled fragments from the memory to the transport layer of the communication network dependent upon the DTD of the XML-type document without a limitation on the size of a message to communicate the XML-type document over the transport layer without loss of information.

In accordance with a further aspect of the invention, there is provided a computer program product comprising a computer readable medium having a computer program recorded therein for streaming an eXtensible Markup Language (XML)-type document over a communication network. The computer program product comprises: a computer program code module for receiving and synchronously converting a sequence of commands into a plurality of XML-type fragments for assembling and streaming a single XML-type document in the communication network, the size of the XML-type document exceeding the size limit imposed by the available memory on the device but less than the size limit imposed by the transport layer of a communication network, a DTD of the XML-type document being able to be broken up into logically independent elements; a computer program code module for assembling the plurality of the XML-type fragments in the memory that is constrained to be smaller in size than the size constraint of the transport layer of the communication network, and a computer program code module for periodically flushing the assembled fragments from the memory to the transport layer of the communication network dependent upon the DTD of the XML-type document without a limitation on the size of a message to communicate the XML-type document over the transport layer without loss of information.

In accordance with yet a further aspect of the invention, there is provided a signal bearing medium tangibly embodying instructions executable by a processor of a mobile computing device. The instructions when loaded into the processor and executed thereon, cause the computing device to perform: receiving and synchronously converting a sequence of commands into a plurality of XML-type fragments for assembling and streaming a single XML-type document in the communication network, the size of the XML-type document exceeding the size limit imposed by the available memory on the device but less than the size limit imposed by the transport layer of a communication network, a DTD of the XML-type document being able to be broken up into logically independent elements; assembling the plurality of the XML-type fragments in the memory that is constrained to be smaller in size than the size constraint of the transport layer of the communication network, the plurality of XML-type fragments comprise at least one of composite commands, commands, and items; and periodically flushing the assembled fragments from the memory to the transport layer of the communication network dependent upon the DTD of the XML-type document without a limitation on the size of a message to communicate the XML-type document over the transport layer without loss of information, and the periodic flushing of the buffer is dependent upon a set of pre-defined rules.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Embodiments of the invention are described hereinafter with reference to the drawings, in which.

DETAILED DESCRIPTION OF THE INVENTION

A description of example embodiments of the invention follows. Method, systems, computer program products, and signal bearing mediums for streaming an XML-type document are described hereinafter. In the following description, numerous specific details, including document type definitions (DTDs), communications protocols, networks, communications devices, and the like are set forth. However, from this disclosure, it will be apparent to those skilled in the art that modifications and/or substitutions may be made without departing from the scope and spirit of the invention. In other circumstances, specific details may be omitted so as not to obscure the invention. As used herein, the term eXtensible Markup Language (XML)-type includes XML and other markup languages or the like having properties and applications the same or similar to XML.

The embodiments of the invention advantageously address and overcome the inefficiency of existing systems by assembling partial XML fragments in memory and flushing the assembled fragments at certain strategic points. Streaming valid XML involves assembling partial XML fragments in a buffer and periodically flushing the buffer provided the contents are so far valid according to the DTD. The embodiments of the invention provide logic for the periodic flushing of the buffer. Advantageously, the device memory no longer imposes a limitation on the message size. A direct result of removing this limitation is improved session times. This enables the generation of size-constrained, valid XML documents using a buffer much smaller than the size constraint.

In the embodiments of the invention, the transport layer imposes a size constraint, and a DTD is able to be broken up into logically independent elements so that a single valid document, exceeding the limit imposed by the available memory on the device but less than the size limit imposed by the transport, can be split into multiple smaller, valid fragments without loss of information.

Figure 2:
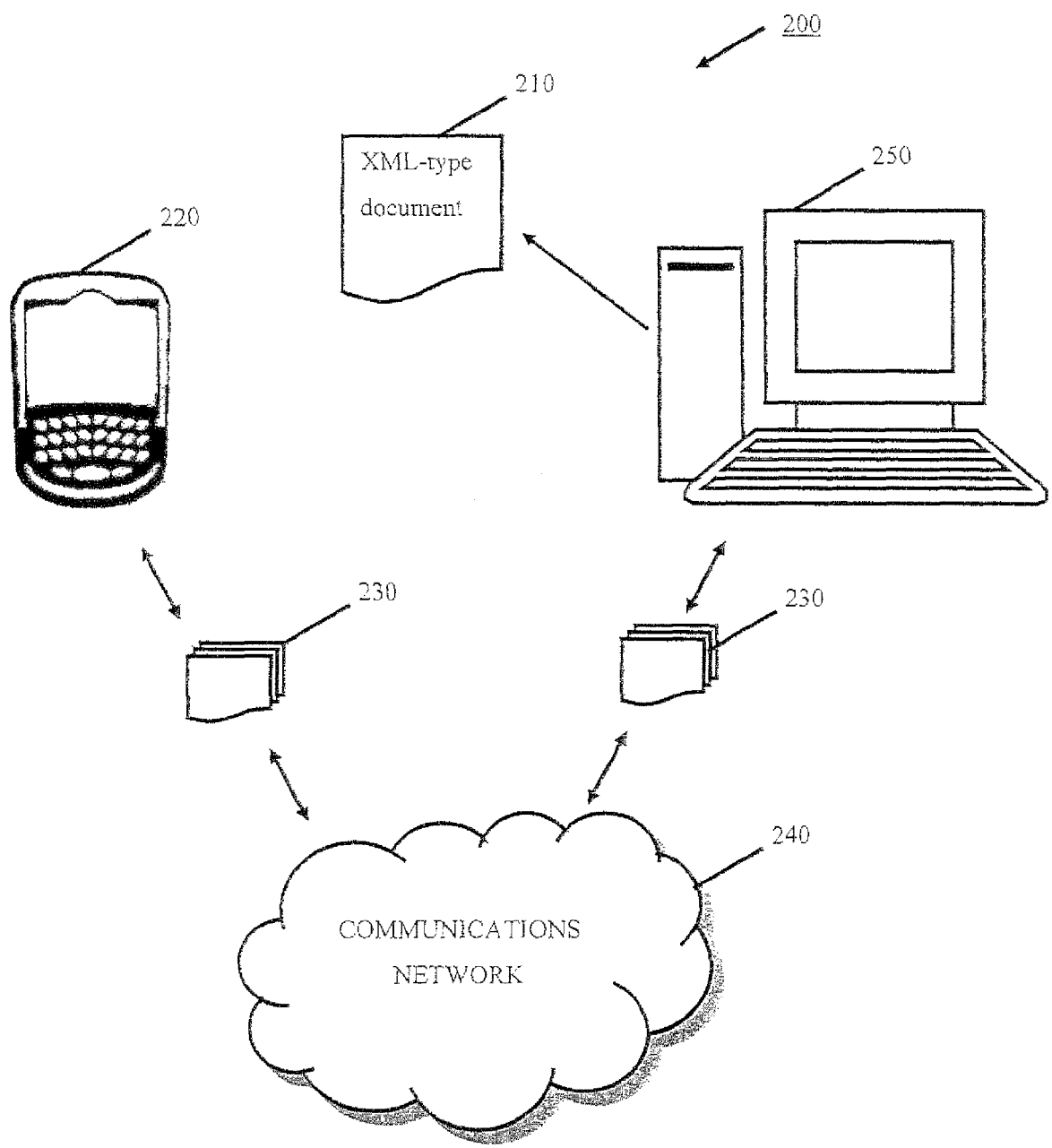
FIG. 2 is a block diagram illustrating an example of a system with which the embodiments of the invention may be practiced.

FIG. 2 illustrates an example of a system 200 with which the embodiments may be practiced. The system 200 includes a computer system or server 250 and one or more mobile devices 220 such as a laptop computer, PDA, mobile phone, which for example can communicate wirelessly using any of a number of known techniques such as GPRS, IEEE 802.11, Bluetooth, and the like. The mobile device 220 can communicate with another computer system or server 250 via a communications network 240. As described in greater detail hereinafter, the mobile device 220 has a constrained or limited size memory or buffer. The mobile device 220 generates an XML-type document in response to a sequence of commands. In particular, XML-type fragments 230 are generated for a single XML-type document 210 and are assembled in a buffer (not shown) that is constrained to be relatively smaller in size than the size constraint of the transport layer of the communication network 240. Periodically, according to specified rules, the XML-type fragments 230 are flushed from the buffer of the mobile device 220 to a transport layer of the communication network 240 and communicated to the computer system 250 to produce the XML-type document 210. This system 100 is merely an example of a system with which the embodiments of the invention may be practiced.

A DTD defines the structure of a message, and each XML message assembled must conform to its DTD. Certain DTDs can be broken up into logically independent elements. For example, in the case of the OMA data synchronization (DS) and device management (DM) protocols, a message is composed of the logical fragments shown in Table 1.

TABLE 1

| No. | Fragment | Description |
| --- | --- | --- |
| 1. | Composite commands | Commands that can contain child commands. Different composite commands have different multiplicities of commands - zero or one/one/zero or more/one or more. |
| 2. | Commands | Commands that act as containers for items. Different commands can have different multiplicities of items - zero or one/one/zero or more/one or more. |
| 3. | Items | The basic execution unit. |

Figure 1:
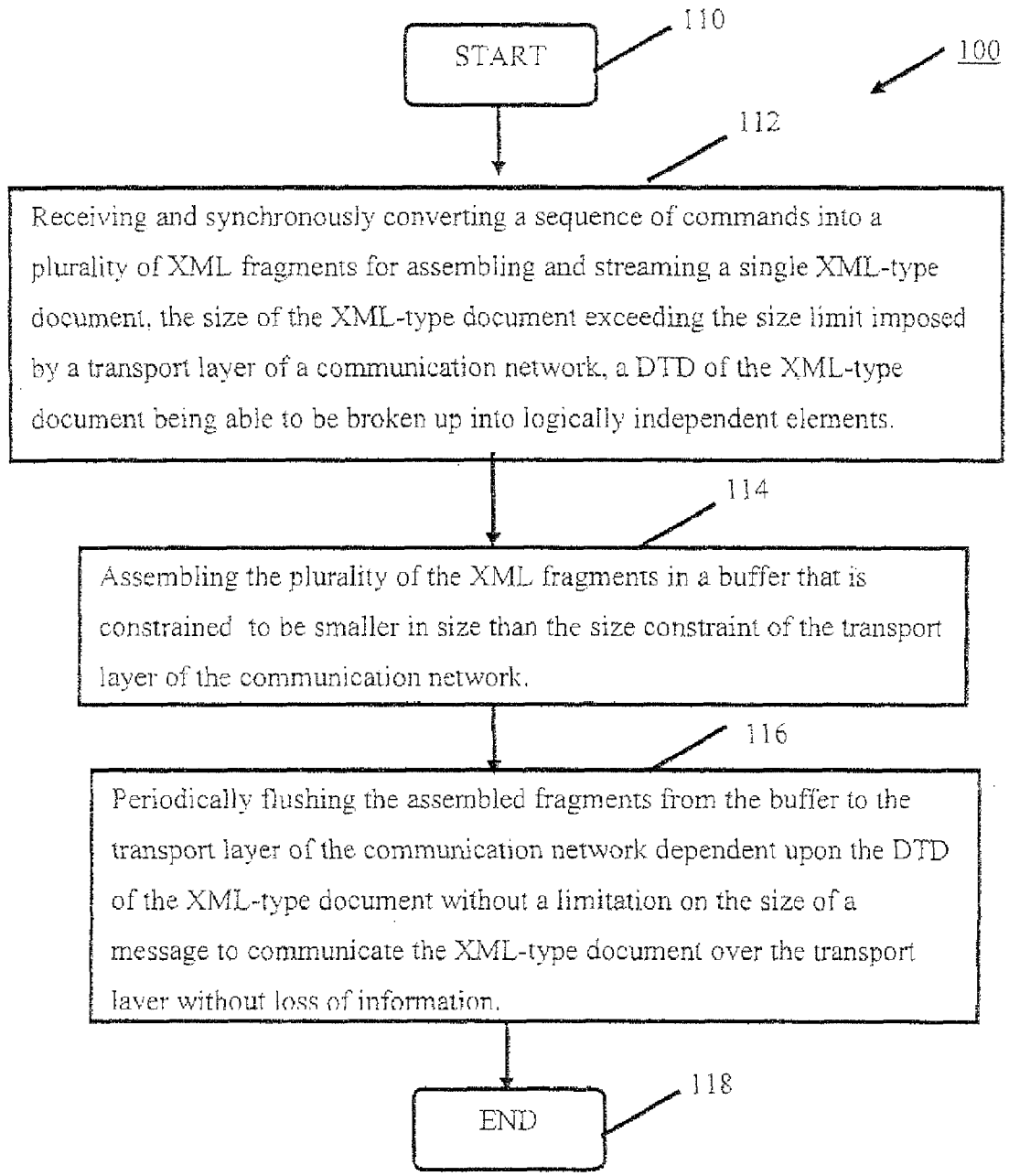
FIG. 1 is a flow diagram of a method streaming an XML-type document over a communication network in accordance with an embodiment of the invention.

FIG. 1 illustrates a method 100 of streaming an XML-type document over a communication network, which commences in step 110. The XML-type document to be streamed does not exist at the start of the process and is programmatically assembled on the fly, as described in the scenarios below. At all times, streaming of the XML-type document should not exceed the size constraint imposed by the transport layer of a communication network.

In step 112, a sequence of commands is received and synchronously converted into XML-type fragments for assembling and streaming a single XML-type document. The size of the XML-type document exceeds the size limit imposed by a transport layer of the communication network. A DTD of the XML-type document can be broken up into logically independent elements. The XML-type fragments may comprise at least one of composite commands, commands, and items, as described above. In step 114, the XML-type fragments are assembled in a buffer (e.g., of a mobile device 220 in FIG. 2) that is constrained to be relatively smaller in size than the size constraint of the transport layer of the communication network. In step 116, the assembled fragments are periodically flushed from the buffer to the transport layer of the communication network. This is done dependent upon the DTD of the XML-type document without a limitation on the size of a message to communicate the XML-type document over the transport layer without loss of information. The buffer is periodically flushed using the rules presented below. The method 100 of FIG. 1 terminates in step 118. Further details of this method are set forth hereinafter. At all times, the total number of bytes that have already been flushed is tracked, and the method ensures that the flushed bytes do not exceed the size constraint. The method of FIG. 1 may be implemented in software as an encoder module in the mobile device 220, for example.

As noted above, an encoder is used to assemble XML-type fragments into an internal buffer and flush those fragments at strategic points. The XML-type encoder provides methods to encode the opening and closing fragments of an element. When an encoding method of Table 2 is invoked, the method returns whether the fragment was successfully encoded. A typical sequence of method calls is given in Table 2.

TABLE 2

| No. | Method | Description |
| --- | --- | --- |
| 1. | Open message | Builds the XML message header. |
| 2. | Open composite command | Builds the opening XML fragment of the composite command. |
| 3. | Open command | Builds the opening XML fragment of the command. |
| 4. | Open item | Builds the opening XML fragment of the item. |
| 5. | Close item | Builds the closing XML fragment of the item. |
| 6. | Close command | Builds the closing XML fragment of the command. |
| 7. | Close composite command | Builds the closing XML fragment of the composite command. |
| 8. | Close message | Builds the XML message footer. |

The encoder uses the rules listed in Table 3 to determine when to flush its internal buffer. Table 3 explains what is returned.

TABLE 3

1. When an element is opened the encoder appends the XML fragment representing the element to the encoder's internal buffer and reserves enough space for the closing XML fragment.
   If the addition of this XML fragment results in a message-size violation, the fragment is removed and the caller is notified that the element has not been encoded.
   If the addition of this XML fragment results in the contents of the internal buffer being 'valid', the contents of the buffer are flushed to the transport and the caller is notified that the element was encoded.
   If the addition of this XML fragment results in the contents of the internal buffer being 'invalid', the buffer is not flushed TABLE 3-continued and the caller is notified that the element has not been encoded. If the element is not encoded, the caller should not try to close the element.
2. When an element is closed, the encoder appends the XML fragment representing the end of the element to the encoder's internal buffer.
If the addition of this XML fragment results in its contents being 'invalid', the contents starting from the opening XML fragment for this element are removed and the caller is notified that the element has not been encoded.
If the addition of this XML fragment results in the contents of the internal buffer being 'valid', the contents of the buffer are flushed to the transport and the caller is notified that the element has been encoded.
Closing an element never results in a message-size violation, since space for the closing XML fragment is reserved when the element has been opened.

To illustrate the embodiment of the invention, Table 4 lists for consideration a DTD and Table 5 lists the associated scenarios. Each step in a scenario specifies the call to the encoder, the buffer contents, and the result.

TABLE 4

<!ELEMENT CommandA (CommandC*)>
<!ELEMENT CommandB (CommandC?, CommandD)>
<!ELEMENT CommandC (Item)>
<!ELEMENT CommandD (Item?)>
<!ELEMENT Item (#PCDATA)>

TABLE 5

SCENARIO 1:
1. Open CommandA           <CommandA> - buffer can be flushed.
2. Close CommandA          </CommandA> - buffer can be flushed.
Streamed XML document:     <CommandA></CommandA>

SCENARIO 2:
1. Open CommandA           <CommandA> - buffer can be flushed.
2. Open CommandC           <CommandC> - buffer cannot be flushed.
3. Open Item               <CommandC><Item>itemdata - buffer can be flushed.
4. Close Item              </Item> - buffer can be flushed.
5. Close CommandC          </CommandC> - buffer can be flushed.
6. Close CommandA          </CommandA> - buffer can be flushed.
Streamed XML document:     <CommandA><CommandC><Item>itemdata</Item></CommandC></CommandA>

SCENARIO 3:
1. Open CommandB           <CommandB> - buffer cannot be flushed.
2. Open CommandC           <CommandB><CommandC> - buffer cannot be flushed.
3. Open Item               <CommandB><CommandC><Item>itemdata - buffer cannot be flushed.
4. Close Item              <CommandB><CommandC><Item>itemdata</Item> - buffer cannot be flushed.
5. Close CommandC          <CommandB><CommandC><Item>itemdata</Item></CommandC> - buffer cannot be flushed.
6. Open CommandD           <CommandB><CommandC><Item>itemdata</Item></CommandC><CommandD> - buffer can be flushed.
7. Close CommandD          </CommandD> - buffer can be flushed.
8. Close CommandB          </CommandB> - buffer can be flushed.
Streamed XML document:     <CommandB><CommandC><Item>itemdata</Item></CommandC><CommandD></CommandD></CommandB>

The method is not specific to the OMA data synchronization (DS) and device management (DM) protocols and can be applied to any XML-based protocol provided it meets certain criteria:

1. A size restriction is imposed by the transport layer; and
2. The DTD provided can be broken up into logically independent elements so that a single large, valid document (exceeding the limit imposed by the memory but less than the limit imposed by the transport) can be split into multiple smaller, valid fragments without loss of information.

The method outlined hereinbefore is not specific to the streaming of messages according to the specified DTD in the specified scenario. The method works for any DTID. While the method is applicable to OMA data synchronization and device management scenarios, the method is not limited to such scenarios. The above reference to the OMA protocols is only an example.

Figure 3:
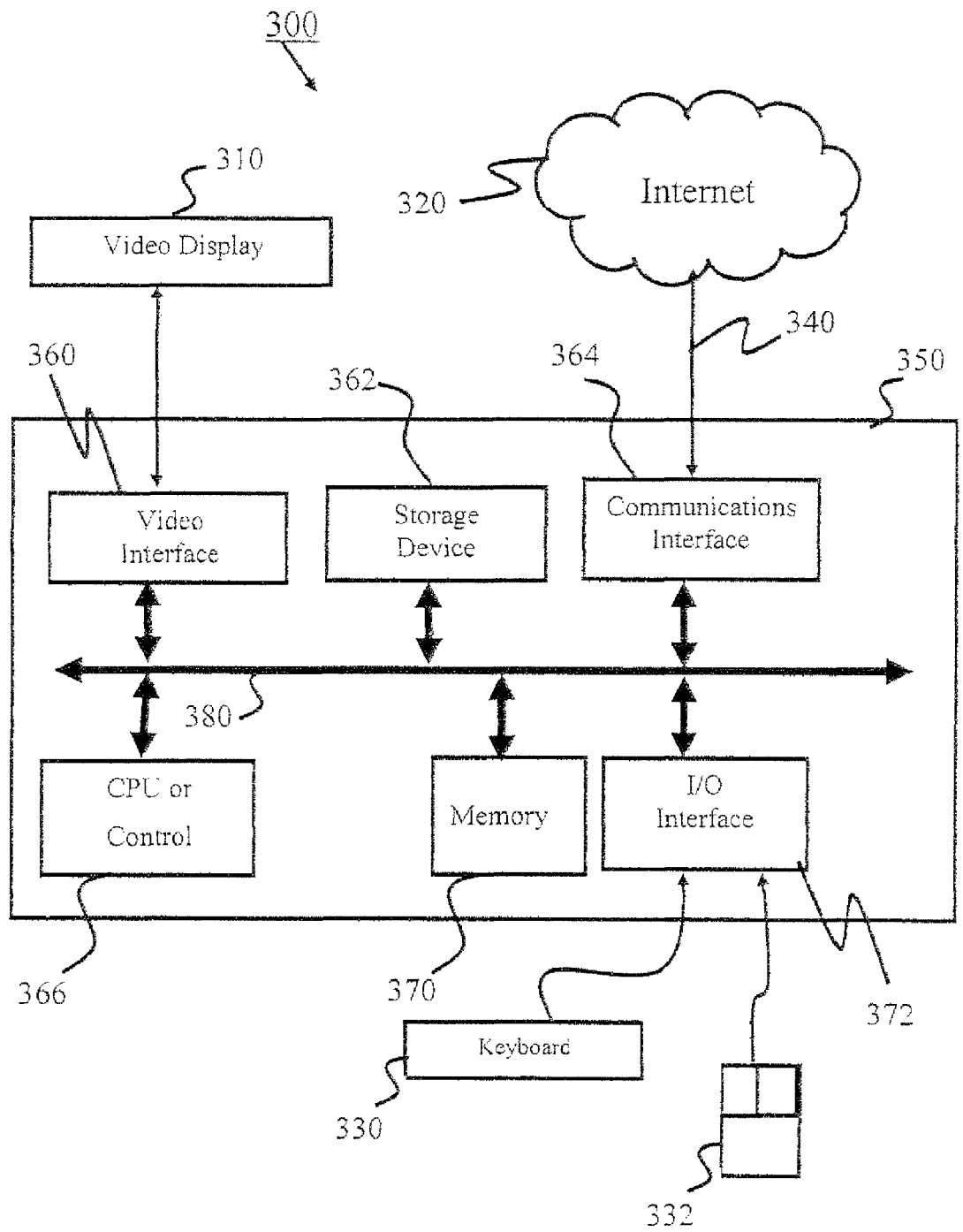
FIG. 3 is a block diagram of a mobile computing device with which embodiments of the invention may implemented.

The embodiments of the invention are preferably implemented using a mobile or portable computing device. In particular, the processing or functionality described above and depicted in FIGS. 1 and 2 can be implemented as software or a computer program executing on the computing device. The method or process steps disclosed for streaming an XML-type document are effected by instructions in the software that are carried out by the computer. The software may be implemented as one or more modules for implementing the process steps. A module is a part of a computer program that usually performs a particular function or related functions. Also, a module can also be a packaged functional hardware unit for use with other components or modules. An example of a computer system 300 with which the embodiments of the invention may be practiced is depicted in FIG. 3.

In particular, the software may be stored in a computer readable medium, including the storage devices described hereinafter. The software is preferably loaded into the computer from the computer readable medium and then carried out by the computer. A computer program product includes a computer readable medium having such software or a computer program recorded on the medium that can be carried out by a computer. The use of the computer program product in the computer preferably implements an advantageous system for streaming an XML-type document in accordance with the embodiments of the invention.

The computer system 300 may include a computer 350, a video display 310, and input devices 330, 332. For example, an operator can use a keyboard 330 and/or a pointing device such as the mouse 332 to provide input to the computer as the input devices. In addition, the computer system can have any of a number of other output devices including line printers, laser printers, plotters, and other reproduction devices connected to the computer. The computer system 300 can be connected to one or more other computers via a communication interface 364 using an appropriate communication channel 340 such as a modem communications path, a computer network, or the like. The computer network may include a local area network (LAN), a wide area network (WAN), an Intranet, and/or the Internet 320.

The computer 350 may include a central processing unit(s) 366 (simply referred to as a processor hereinafter), a memory 370 which may include random access memory (RAM) and read-only memory (ROM), input/output (IO) interfaces 372, a video interface 360, and one or more storage devices 362. The storage device(s) 362 may include one or more of the following: a floppy disc, a hard disc drive, a magneto-optical disc drive, CD-ROM, DVD, magnetic tape or any other of a number of non-volatile storage devices well known to those skilled in the art. Each of the components of the computer 350 is typically connected to one or more of the other devices via a bus 380 that in turn can consist of data, address, and control buses.

The computer system 300 is simply provided for illustrative purposes and other configurations can be employed without departing from the scope and spirit of the invention. Computers with which the embodiment can be practiced include IBM-PC/ATs or compatibles, one of the Macintosh™ family of PCs, Sun Sparcstation™, a workstation or the like. The foregoing are merely examples of the types of computers with which the embodiments of the invention may be practiced. Typically, the processes of the embodiments, described hereinafter, are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the computer program may be supplied to the user encoded on a CD ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely an example of relevant computer readable mediums. Other computer readable mediums may be practiced without departing from the scope and spirit of the invention. In yet another embodiment, a signal bearing medium tangibly embodies instructions executable by a processor of a mobile computing device. The storage device(s) 362 described above may be used to implement such a signal bearing medium, in which the instructions when loaded into the processor and executed cause the computing device to perform the functionality described hereinbefore with reference to FIGS. 1 and 2.

While this invention has been particularly shown and described with references to example embodiments thereof, it will be understood by those skilled in the art that various changes in form and details may be made therein without departing from the scope of the invention encompassed by the appended claims.

What is claimed is:

1. A method of streaming an eXtensible Markup Language (XML)-type document over a communication network, said method comprising: receiving a sequence of commands in a subject mobile device;
   in the subject mobile device, synchronously converting the sequence of commands into a plurality of XML-type fragments configured for-assembling on the fly and streaming a single XML-type document in said communication network, the subject mobile device being a sending mobile device relative to the XML-type document, the size of the XML-type document exceeding a size limit imposed by available memory on the sending mobile device but less than the size limit imposed by the transport layer of the communication network, a DTD of the XML-type document being able to be broken up into logically independent elements;
   assembling portions of the plurality of said XML-type fragments one at a time in a buffer of the sending mobile device, the buffer being constrained to be smaller in size than the size constraint of said transport layer of said communication network; and
   between times of assembling different portions, flushing the assembled fragments from said buffer to said transport layer of said communication network, said flushing being dependent upon said DTD of said XML-type document, and said flushing removing a limitation on the size of a message to communicate said XML-type document over said transport layer and maintaining information of the XML-type document.

2. The method according to claim 1, wherein said plurality of XML-type fragments comprise at least one of composite commands, commands, and items.

3. The method according to claim 1, wherein said flushing of said buffer is dependent upon a set of rules.

4. The method according to claim 3, further comprising, if an element of said XML-type document is one of a command and an item:
   appending an opening XML-type fragment representing the element to said buffer; and
   reserving space in said buffer for a corresponding closing XML-type fragment.

5. The method according to claim 4, further comprising, (a) if appending said XML-type fragment to said buffer results in a size limit violation:
   removing said opening XML-type fragment from said buffer; and
   notifying a user that the element has not been encoded;
   (b) if appending said XML-type fragment results in the contents of said buffer being 'valid':
   flushing said buffer to said transport layer; and
   notifying a user that the element was encoded;

(c) if appending said XML-type fragment results in the contents of said buffer being 'invalid':
not flushing said buffer; and
notifying a user that the element has not been encoded.

6. The method according to claim 4, further comprising, appending a closing XML-type fragment representing the end of the element to said buffer.

7. The method according to claim 6, further comprising, (i) if the addition of said closing XML fragment results in the contents of said buffer being 'invalid':
removing the contents of said buffer starting from the opening XML fragment for said element; and
notifying a user that the element has not been encoded; and
(ii) if the addition of said closing XML fragment results in the contents of said buffer being 'valid':
flushing the contents of said buffer to said transport layer; and
notifying a user that the element has been encoded.

8. A system for streaming an eXtensible Markup Language (XML)-type document over a communication network, said system comprising:
a memory in a sending device, the memory configured for buffering data and instructions;
a communications interface for coupling said system to said communications network; and
a processor coupled to said memory and said communications interface, said processor executing instructions for:
receiving a sequence of commands;
synchronously converting the sequence of commands into a plurality of XML-type fragments configured for assembling on the fly and streaming a single XML-type document on the fly in said communication network, the size of the XML-type document exceeding the size limit imposed by the memory in the sending device but less than the size limit imposed by the transport layer of the communication network, a DTD of the XML-type document being able to be broken up into logically independent elements;
assembling portions of the plurality of said XML-type fragments one at a time in said memory, wherein the memory is constrained to be smaller in size than the size constraint of said transport layer of said communication network; and
between times of assembling different portions, flushing the assembled fragments from said memory to said transport layer of said communication network, said flushing being dependent upon said DTD of said XML-type document, and said flushing removing a limitation on the size of a message to communicate said XML-type document over said transport layer and maintaining information of the XML-type document.

9. The system according to claim 8, wherein said plurality of XML-type fragments comprise at least one of composite commands, commands, and items.

10. The system according to claim 8, wherein said periodic flushing of said buffer is dependent upon a set of rules.

11. A computer program product comprising a non-transitory, tangible computer readable storage medium having a computer program recorded therein for streaming an eXtensible Markup Language (XML)-type document over a communication network, said computer program product comprising:

computer program code means for receiving a sequence of commands;
computer program code means for synchronously converting the sequence of commands into a plurality of XML-type fragments configured for assembling on the fly and streaming a single XML-type document in said communication network, the size of the XML-type document exceeding the size limit imposed by available memory on a sending mobile device but less than the size limit imposed by the transport layer of the communication network, a DTD of the XML-type document being able to be broken up into logically independent elements;
computer program code means for assembling portions of the plurality of said XML-type fragments one at a time in said memory that is constrained to be smaller in size than the size constraint of said transport layer of said communication network; and
computer program code means for between times of assembling different portions, flushing the assembled fragments from said memory to said transport layer of said communication network dependent upon said DTD of said XML-type document, said flushing enabling: (i) removal of a limitation on the size of a message to communicate said XML-type document over said transport layer, and (ii) streaming of the XML-type document as valid lossless fragments.

12. The computer program product according to claim 11, wherein said plurality of XML-type fragments comprise at least one of composite commands, commands, and items.

13. The computer program product according to claim 11, wherein said periodic flushing of said buffer is dependent upon a set of rules.

14. A system of streaming an eXtensible Markup Language (XML)-type document over a communication network, said system comprising:
an encoder executable by a processor and receiving a sequence of commands in a subject mobile device;
in the subject mobile device, the encoder synchronously converting the sequence of commands into a plurality of XML-type fragments configured for assembling on the fly and streaming a single XML-type document in said communication network, the subject mobile device being a sending mobile device relative to the XML-type document, the size of the XML-type document exceeding a size limit imposed by available memory on the sending mobile device but less than the size limit imposed by the transport layer of the communication network, a DTD of the XML-type document being able to be broken up into logically independent elements;
a buffer assembly assembling portions of the plurality of said XML-type fragments one at a time in a buffer of the sending mobile device, the buffer being constrained to be smaller in size than the size constraint of said transport layer of said communication network; and
flush logic executed by the processor for flushing the assembled fragments from said buffer to said transport layer of said communication network between times of assembling different portions, said flushing being dependent upon said DTD of said XML-type document and said flushing removing limitation on the size of a message to communicate said XML-type document over said transport layer and maintaining information of the XML-type document.

* * * * *